United States Patent
Tseng et al.

(10) Patent No.: US 9,747,522 B2
(45) Date of Patent: Aug. 29, 2017

(54) IMAGE PROCESSING CIRCUIT AND METHOD THEREOF

(71) Applicant: MStar Semiconductor, Inc., Hsinchu Hsien (TW)

(72) Inventors: Yu-Hsiang Tseng, Zhubei (TW); Cheng-Yu Hsieh, Zhubei (TW); Wei-Hsiang Hong, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 84 days.

(21) Appl. No.: 14/587,102

(22) Filed: Dec. 31, 2014

(65) Prior Publication Data
US 2015/0186749 A1 Jul. 2, 2015

(30) Foreign Application Priority Data
Jan. 2, 2014 (TW) .............................. 103100009 A

(51) Int. Cl.
*G06K 9/62* (2006.01)
*G06K 9/56* (2006.01)

(52) U.S. Cl.
CPC ............ *G06K 9/6202* (2013.01); *G06K 9/56* (2013.01)

(58) Field of Classification Search
CPC .............................. G06K 9/56; G06K 9/6202

USPC ......................................................... 382/217
See application file for complete search history.

(56) References Cited

U.S. PATENT DOCUMENTS

| | | | |
|---|---|---|---|
| 6,690,728 B1 * | 2/2004 | Chang | H04N 5/145 348/413.1 |
| 9,053,384 B2 * | 6/2015 | Cao | G06K 9/4642 |
| 2013/0050413 A1 * | 2/2013 | Tsukamoto | H04N 13/0018 348/42 |

* cited by examiner

*Primary Examiner* — Stephen R Koziol
*Assistant Examiner* — Shaghayegh Azima
(74) *Attorney, Agent, or Firm* — Edell, Shapiro & Finnan, LLC

(57) ABSTRACT

An image processing method is provided. The method is for calculating a first weighted sum of absolute difference (WSAD) of a first search window and a corresponding first target window, and a second WSAD of a second search window and a corresponding second target window. The first and second search windows have a common matching window, and the first and second target windows have a common target block. The method includes: a) calculating a plurality of absolute differences of the common matching window and the common target block; b) determining a first weight coefficient group and a second weight coefficient group; and c) summing up products of multiplying the absolute differences by the first weight coefficient group to generate the first WSAD, and summing up products of multiplying the absolute differences by the second weight coefficient group to generate the second WSAD.

14 Claims, 11 Drawing Sheets

$$WSAD = \sum_{i=0}^{n}\sum_{j=0}^{k}(|R_{ij} - C_{ij}| \times W_{ij})$$

IMAGE PROCESSING CIRCUIT AND METHOD THEREOF

This application claims the benefit of Taiwan application Serial No. 103100009, filed Jan. 2, 2014, the subject matter of which is incorporated herein by reference.

BACKGROUND OF THE INVENTION

Field of the Invention

The invention relates in general to an image processing circuit and a method thereof, and more particularly to a circuit that calculates a weighted sum of absolute difference (WSAD) of an image and a method thereof.

Description of the Related Art

FIG. 1 shows a schematic diagram of a conventional similarity matching procedure based on a window. A target image 110 includes a target window 115. In the matching procedure, a search window 123 is first determined from a reference window 120, and a plurality of matching candidates (or referred to as matching windows) 125 are identified from the search window 123. A sum of absolute difference (SAD) operation is then performed on the matching windows 125 and the target window 115. To determine the search window 123, a corresponding point 127 corresponding to a center 117 of the target window 115 may be first identified from the reference window 120 (i.e., the center 117 and the corresponding point 127 have the same coordinates in the target image 110 and the reference image 120), so as to determine a position of the search window 123 and then determine a size of the search window 123 according to a range to be matched. After having determined the search window 123, a plurality of matching windows 125 may then be identified therefrom. For example, a corresponding relationship of the matching window 125 and the corresponding point 127 is as shown by matching windows 125-00 to 125-$nk$ below the reference image 120 in FIG. 1. As shown, each of the matching windows 125 has a width of n+1 pixels and a height of k+1 pixels, and includes the corresponding point 127, where n and k are both positive integers. Further, the search window 123 has a width of 2n+1 pixels and a height of 2k+1 pixels. FIG. 2 shows a schematic diagram of a corresponding relationship of the matching window 125, the target window 115 and weight coefficients. R and C respectively represent characteristic values (e.g., such as luminance and chrominance information) of the matching window 125 and the target window 115, and the SAD is calculated as an equation below:

$$SAD = \sum_{i=0}^{n}\sum_{j=0}^{k} |R_{ij} - C_{ij}| \quad \text{equation 1}$$

Certain positions in the matching window 125 are sometimes the focus of image matching, and so a weight may be added into the SAD calculation to reinforce the significance of pixels at these positions. The SAD calculated with a weight is referred to as a weighted SAD (WSAD). As shown in FIG. 2, a weight coefficient group 210 includes a weight coefficient W corresponding to each of the pixels in the matching window 125 and the target window 115. The WSAD is calculated as an equation below:

$$WSAD = \sum_{i=0}^{n}\sum_{j=0}^{k} (|R_{ij} - C_{ij}| \times W_{ij}) \quad \text{equation (2)}$$

Compared the SAD calculated without a weight (equation (1)), the WSAD involves an additional multiplication operation, which poses an extra load for an image processing circuit implemented by either hardware or software.

For the sake of simplicity, an example where n and k are both equal to 2 is given below to illustrate the window matching calculation based on a WSAD. FIG. 3 shows a schematic diagram of a conventional image matching calculation procedure based on 3×3 matching windows. As shown, a search window 323 has a size of 5×5, and is centered at a corresponding point 327. The corresponding point 327 corresponds to the center 117 of the target window 115 of the target image 110. In the search window 323, nine matching windows having a size of 3×3 are formed. Relative positions of the matching windows 325 and the corresponding point 327 are as shown by nine matching windows 325-00 to 325-22 below the reference image 120. Below the target image 110, weight coefficient groups 310-00 to 310-22 respectively corresponding to the matching windows 325 are depicted. All of the coefficient sets together form a weight coefficient set. Therefore, for a window matching procedure for a search window in a size of 5×5 and a matching window in a size of 3×3, nine rounds of operations based on equation (2) need to be performed to obtain the WSAD values of the nine matching windows 325 to further identify the matching window 325 having the smallest WSAD value.

In the above description, the corresponding point 327 corresponds to the center 117 of the target window 115 of the target image 110. However, in some more complicated algorithms, regarding only the center 117 of the target window 115 for identifying the corresponding points cannot satisfy all kinds of scenarios, and so more sophisticated window matching operations are developed. FIG. 4 shows a diagram of a corresponding relationship of a plurality of search windows generated according to a plurality of corresponding points in a reference image and a target image in the prior art. In this example, the matching windows and the target window are in a same size of 3×3. Respective corresponding points of nine pixels included in a target window 482 in a target image 480 can all be identified in a reference image 460. Thus, in FIG. 4, nine sub-diagrams respectively represent corresponding relationships of nine search windows, a corresponding point, and reference points 484 in the target window 482. Taking the uppermost sub-diagrams for example, the reference point 484 is located at the upper-left corner of the target window 482, a corresponding point 417 can be identified in the reference image 460, and a search window 413 in a size of 5×5 can be determined according to the corresponding point 417. The search window 413 may further determine nine matching windows 415, each of which including the corresponding point 417. Nine relative positions below the reference image 120 in FIG. 3 show a corresponding relationship of the matching window 415 and the corresponding point 417. Other variations of the reference point 484 and the target widow 482 are as shown by the remaining sub-diagrams, and associated description shall be omitted herein. A search window range 410 in the diagram represents a range in which the search window 413 moves about the 9 variations. In this example, the search window range 410 has a length of 7 pixels and a width of also 7 pixels.

According to the above method for calculating the WSAD, each of the matching windows corresponds to one weight coefficient group, and nine different matching windows can be determined based on the nine variations of the search window in FIG. 4. For the window matching procedure in FIG. 4, when calculating the WSAD, there are a total of 9×9=81 weight coefficient groups that need to be considered. FIG. 5 shows a schematic diagram of pixels in a search window range of a reference image and corresponding pixels in a target image. FIG. 6 shows a circuit diagram of a conventional WSAD calculation unit. In FIG. 5, the left half shows the pixels included in the search window range 410 of the reference image 460, and the right half shows the corresponding pixels in the target image 480 to be used for a WSAD operation with the pixels in the search window range 410. The WSADs of all of the matching windows of a search window 510 are first calculated. The search window 510 corresponds to a target window 510C. Characteristic values of nine pixels ($R_{00} \sim R_{22}$) of the upper-left matching window (x=0~2, y=0~2) in the search window 510 and nine pixels ($C_{00} \sim C_{22}$) of the corresponding target block (x=0~2, y=0~2) in the target window 510C are inputted into the WSAD calculation unit 60 in FIG. 6. The WSAD calculation unit 60 includes nine absolute difference calculation units 610, each of which calculates the absolute difference of the characteristic values of one set of pixels and outputs a value $|R_{ij} - C_{ij}|$, where i=0~2 and j=0~2. A multiplication unit 620 identifies a corresponding weight coefficient group from the weight coefficient set, and multiplies the absolute difference generated in the previous stage by the identified weight coefficient group to obtain a weighted absolute difference. An addition unit 630 then adds up all the nine weighted absolute differences to generate the WSAD of the matching window.

Next, the middle-left matching window (x=0~2, y=1~3) (corresponding to the middle-left target block in the target window 510C, and so forth), the lower-left matching window (x=0~2, y=2~4), the three middle matching windows (x=1~3, y=0~4), and the three right matching windows (x=2~4, y=0~4) of the search window 510 are sequentially calculated, until the WSADs of all the nine matching windows of the search window 510 are obtained. For the search window 520 and the target window 520C, and the search window 530 and the target window 530C, the same method is used to calculate the WSADs of the respective nine matching windows. In FIG. 5, there are also respectively three search windows in the middle (x=0~6, y=1~5) and at the bottom (x=0~6, y=2~6) of the search range 410. Thus, the search window range 410 includes a total of 9×9=81 matching windows. To simultaneously obtain 81 WSADs, 81 of the WSAD calculation unit 60 shown in FIG. 6 are needed. Further, each of the WSAD calculation units 60 includes nine absolute difference calculation units 610, leading to a considerable amount of logic gates required. In the above description, a 3×3 matching window is given as an example for explaining a circuit required. That is to say, even more hardware resources are needed for a larger matching window, resulting in drawbacks of increased costs and excessively large circuit areas.

SUMMARY OF THE INVENTION

The invention is directed to an image processing circuit and an image processing method for saving circuits that are required for calculating a weighted SAD (WSAD) of an image.

The present invention discloses an image processing circuit adapted to calculate a first minimum WSAD of a first search window in a reference image and a corresponding first target window in a target image, and a second minimum WSAD of a second search window in the reference image and a corresponding second target window in the target image. The image processing circuit includes: a calculation module, configured to generate a plurality of first WSADs according to the first search window, the first target window and a weight coefficient set, and to generate a plurality of second WSADs according to the second search window, the second target window and the weight coefficient set; and a comparison unit, configured to compare the first WSADs and the second WSADs to generate the first minimum WSAD and the second minimum WSAD, respectively. The first and second search windows have a common matching window, and the first and second target windows have a common target block. The calculation module generates one of the first WSADs and one of the second WSADs according to the common matching window, the common target block and the weight coefficient set.

The present invention further discloses an image processing method for calculating a first WSAD of a first search window in a reference image and a corresponding first target window in a target image, and a second WSAD of a second search window in the reference image and a corresponding second target window in the target image. The first and second search windows have a common matching window, and the first and second target windows have a common target block. The method includes: a) calculating a plurality of absolute differences between a plurality of pixels in the common matching window and corresponding pixels in the common target block; b) selecting a first weight coefficient group from a weight coefficient set; c) selecting a second weight coefficient group from the weight coefficient set; d) sharing the absolute differences generated in step (a), summing up products of multiplying the absolute differences by the first weight coefficient group to generate the first WSAD, and summing up products of multiplying the absolute differences by the second weight coefficient group to generate the second WSAD.

The present invention further discloses an image processing circuit adapted to calculate a first WSAD of a first search window in a reference image and a corresponding first target window in a target image, and a second WSAD of a second search window in the reference image and a corresponding second target window in the target image. The first and second search windows have a common matching window including a plurality of pixels, and the first and second target windows have a common target block including a plurality of pixels. The image processing circuit includes: a plurality absolute difference calculation units, configured to respectively calculate absolute differences between a pixel in the common matching window and a corresponding pixel in the common target block; a first multiplication unit, configured to multiply the absolute differences by a first weight coefficient group of a weight coefficient set to generate a plurality of first weighted absolute differences; a first addition unit, configured to add the first weighted absolute differences to obtain the first WSAD; a second multiplication unit, configured to multiply the absolute differences by a second weight coefficient group of the weight coefficient set to generate a plurality of second weighted absolute differences; and a second addition unit, configured to add the second weighted absolute differences to obtain the second WSAD.

The image processing circuit and method of the present invention are capable of sharing circuits for calculating absolute differences of pixels to decrease the number of logic gates in the circuit and reduce costs. Compared to known technologies, the image processing circuit of the present invention is capable of obtaining a plurality of WSADs corresponding to multiple different search windows using only one set of absolute difference calculation circuit. Therefore, the image processing circuit of the present invention not only reduces hardware requirements but also enhances calculation efficiency.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses an image processing circuit and method capable reducing hardware that is used for calculating weighted sums of absolute difference (WSADs). In possible implementation, one skilled person in the art may choose equivalent elements or steps to implement the disclosure based on the disclosure of the application. That is, the implementation of the disclosure is not limited in the embodiments disclosed in the disclosure. Further, a part of the elements included in the image processing circuit may be individually known elements. Without affecting the full disclosure and possible implementation of the device, details of the known elements are omitted. Further, the signal processing method may be performed by the signal processing circuit of the disclosure or an equivalent device. Without affecting the full disclosure and possible implementation of the method of the disclosure, the description of the method focuses on the steps of the method instead of hardware.

Figure 1:
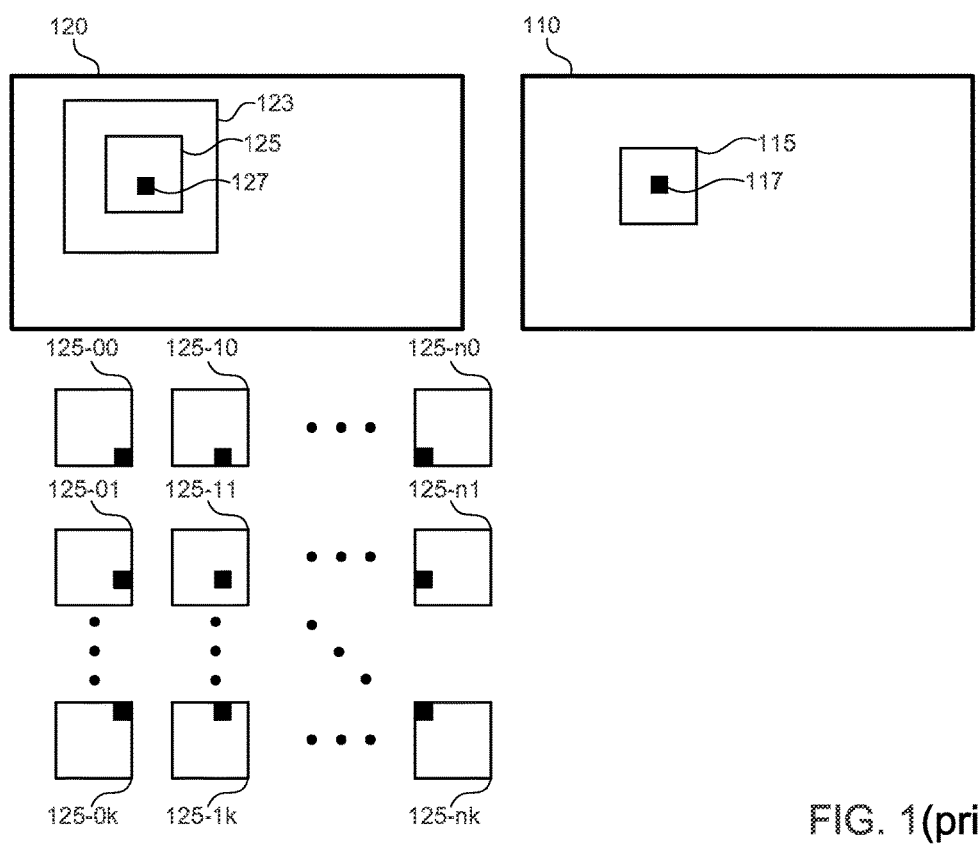
FIG. 1 is a schematic diagram of a conventional image similarity matching procedure based on a window.
Figure 2:
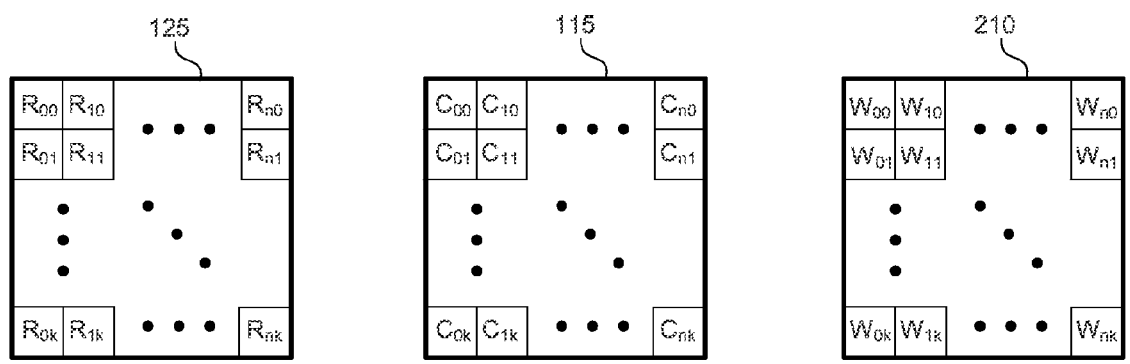
FIG. 2 is a schematic diagram of a corresponding relationship of a matching window, a target window and weight coefficients.
Figure 3:
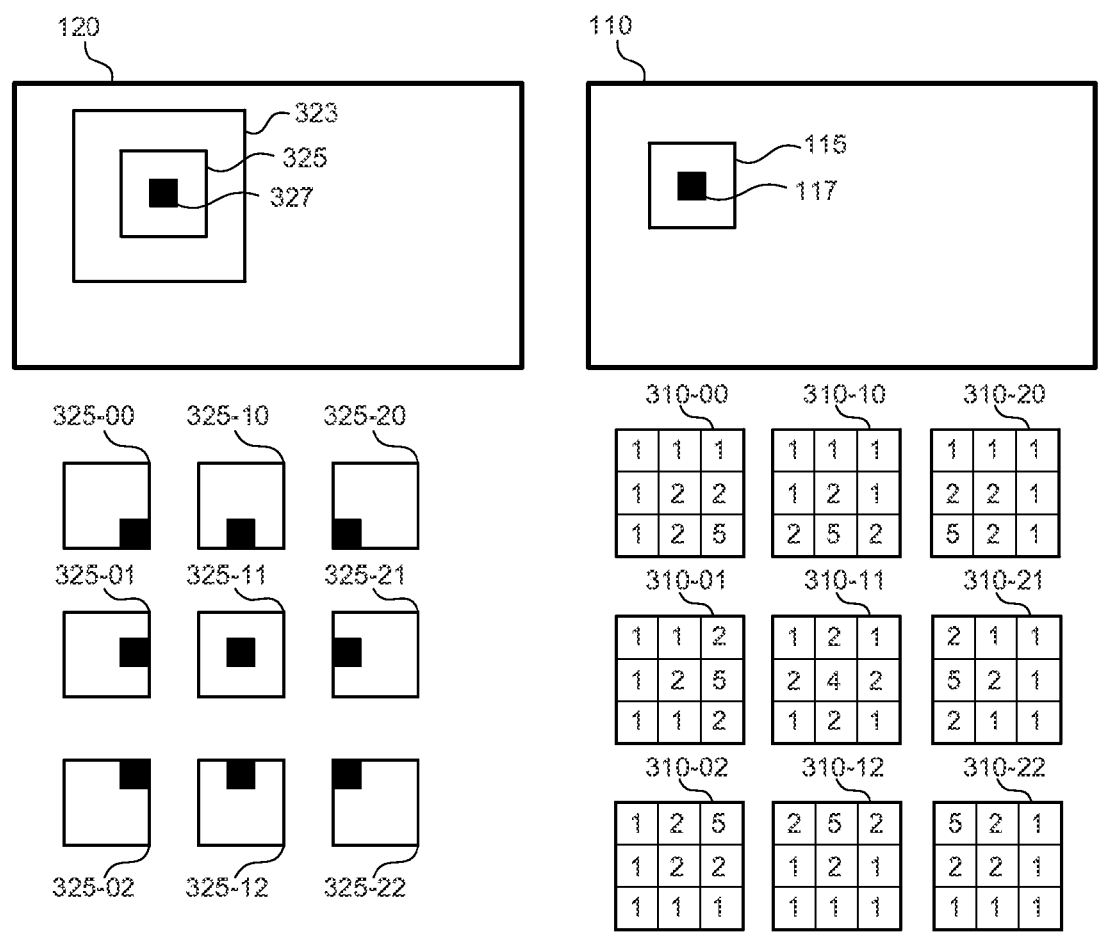
FIG. 3 is a schematic diagram of a conventional image matching calculation based on 3×3 matching windows.
Figure 4:
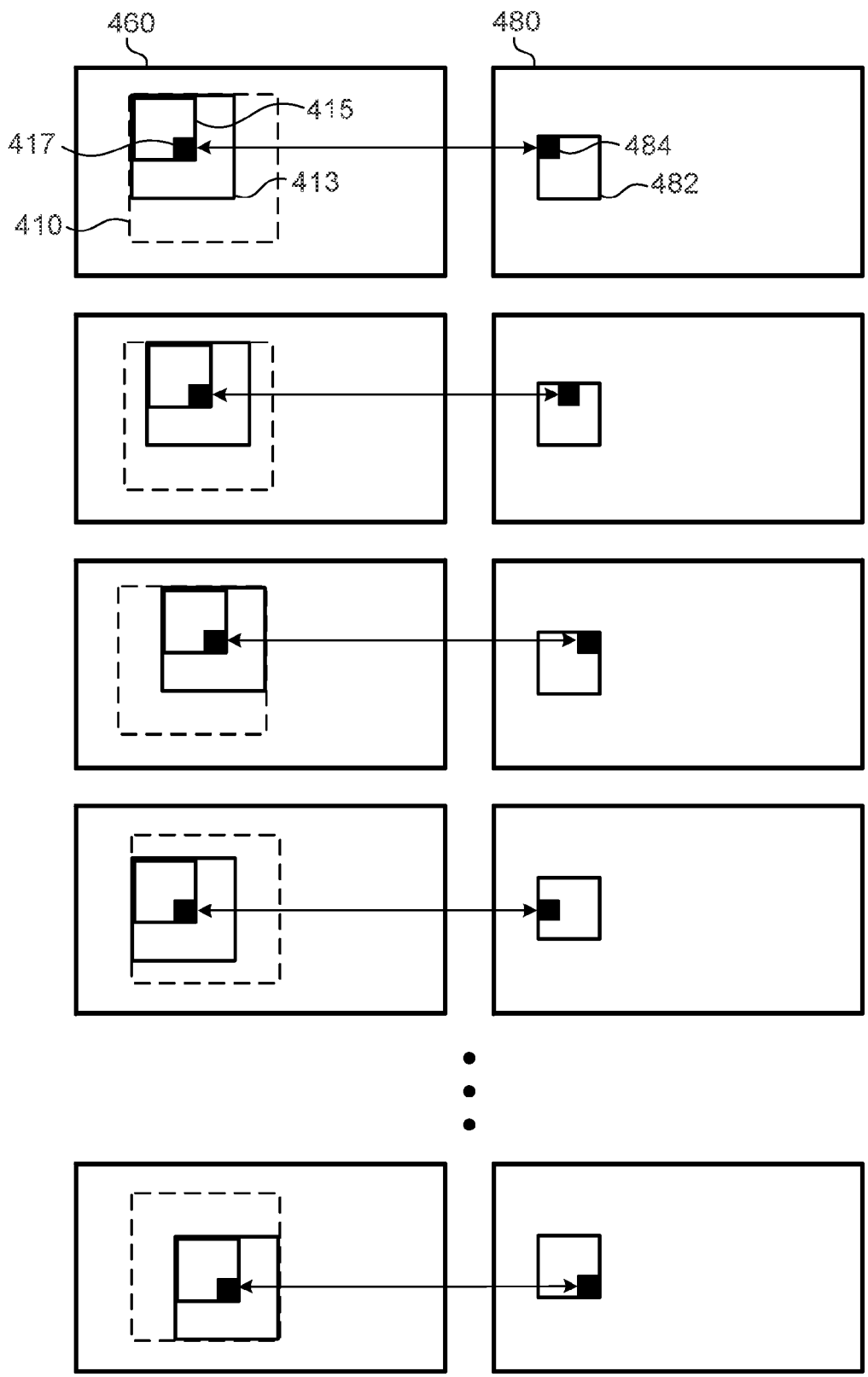
FIG. 4 is a diagram of a corresponding relationship of a plurality of search windows generated according to a plurality of corresponding points in a reference image and a target image in the prior art.
Figure 7:
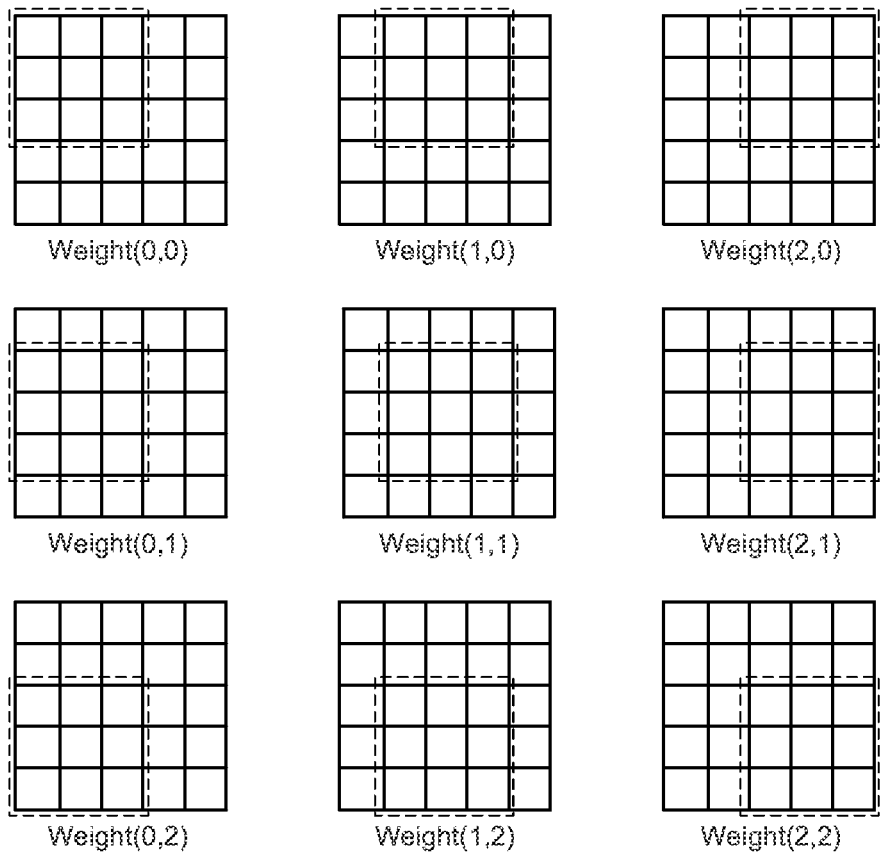
FIG. 7 is a diagram of a corresponding relationship of a matching window and weight coefficient groups.

For illustration purposes, weight coefficient groups corresponding to a matching window are numbered. FIG. 7 shows a diagram of a corresponding relationship of a matching window and weight coefficient groups. Also referring to FIG. 5, in the example, nine search windows can be defined from 7×7 pixels. More specifically, three search windows 510 to 530 can be defined for (x=0~6, y=0~4), and three search windows can also be respectively defined for (x=0~6, y=1~5) and (x=0~6, y=2~6). In each of the search windows, nine matching windows can be defined, as shown in FIG. 7. Weight coefficient groups Weight(0, 0), Weight(1, 0), Weight(2, 0), . . . and Weight(2, 2) respectively correspond to relative positions of different matching windows and the search window. That is to say, the upper-left matching windows at respective of the search windows 510 and 520 use the weight coefficient group Weight(0, 0), the middle matching windows use the weight coefficient group Weight(1, 1), and so forth. The composition of the weight coefficients is similar to that of the weight coefficient groups 310-00~310-22 in FIG. 3. A collection of these weight coefficients are referred to as a weight coefficient set.

The weight coefficient groups may be determined differently. For example, all matching windows of a same search window may correspond to a same weight coefficient group. More specifically, for example, the search window 510 in FIG. 5 corresponds to the weight coefficient group Weight0, and the nine matching windows in the search window 510 all use this weight coefficient group; the nine matching windows in the search window 520 corresponds to the weight coefficient group Weight1; the nine matching windows in the search window 530 corresponds to the weight coefficient group Weight2; and so forth. Similarly, the composition of the weight coefficient groups (Weight0~Weight8) is similar to that of the weight coefficient groups 310-00~310-22 in FIG. 3. A collection of these weight coefficient groups is referred to as a weight coefficient set.

Again referring to FIG. 5, it is observed that the search windows 510, 520 and 530 share a part of the pixels (or referred to as common pixels). For example, the search windows 510 and 520 share all pixels in a range (x=1~4, y=0~4); the search windows 520 and 530 share all pixels in a range (x=2~5, y0~4). That is to say, two 5×5 adjacent search windows share 4×5 pixels. All of the three search windows 510, 520 and 530 share all pixels in a range (x=2~4, y=0~4). A part of common pixels correspond to different weight coefficient groups as these common pixels individually belong to different search windows. For example, the matching window (the solid dots) formed by (x=2~4, y=0~2) in the search windows 510, 520 and 530 respectively corresponds to weight coefficient groups Weight(2, 0), Weight(1, 0) and Weight(0, 0) (corresponding to the foregoing first method for determining weight coefficients), or Weight0, Weight1 and Weight2 (corresponding to the foregoing second method for foregoing first method for determining weight coefficients). However, when calculating absolute differences, these common pixels correspond to the same pixels in the target image. More specifically, the search windows 510 and 520 have three common matching windows (i.e., (x=2~4, y=0~2), (x=2~4, y=1~3), and (x=2~4, y=2~4), respectively). Similarly, the target windows 510C and 520C respectively corresponding to the search windows 510 and 520 have six common target blocks (i.e., (x=1~3, y=0~2), (x=1~3, y=1~3), (x=1~3, y=2~4), (x=2~4, y=0~2), (x=2~4, y=1~3), and (x=2~4, y=2~4), respectively). When calculating the upper-right matching window (shown in solid dots) of the search window 510 and calculating the upper-middle matching window (shown in solid dots) of the search window 520, the pixel data used is the same. That is to say, although the same matching window in different search windows correspond to different weight coefficient groups, reference pixels used for calculating the absolute differences are the same. Therefore, the part used for calculating the absolute differences in a circuit for calculating WSADs can be shared.

Figure 8:
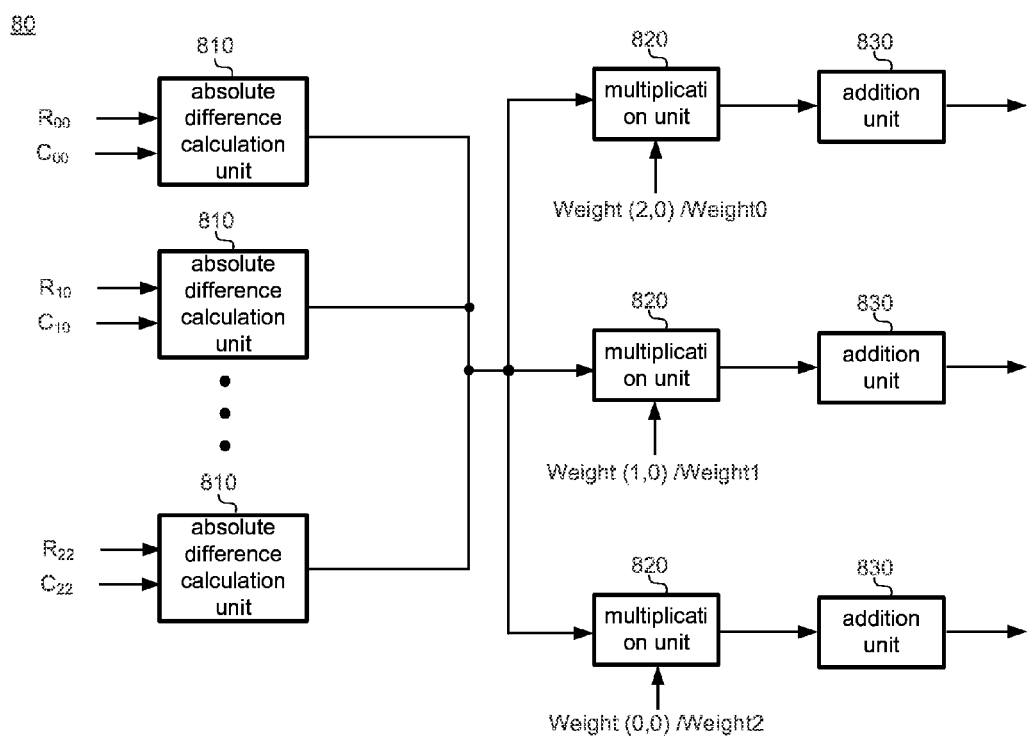
FIG. 8 is a circuit diagram of a WSAD calculation unit of the present invention.

FIG. 8 shows a circuit diagram of a WSAD calculation unit of the present invention. In FIG. 8, a matching window in a size of 3×3 is taken as an example. A WSAD calculation unit 80 includes nine absolute difference calculation units 810, three multiplication units 820, and three addition units 830. The absolute difference calculation units 810 calculate absolute values of differences of characteristic values of two corresponding pixels, respectively. The multiplication units 820 are coupled to the absolute difference calculation units 810, and multiply absolute differences generated in the previous stage by respective corresponding weight coefficient groups according to different search windows. For example, for the search window 510, the absolute difference is multiplied by the weight coefficient group Weight(2, 0) or Weight0; for the search window 520, the absolute difference is multiplied by the weight coefficient group Weight(1, 0) or Weight1; for the search window 530, the absolute difference is multiplied by the weight coefficient group Weight(0, 0) or Weight2. Because the matching window formed by (x=2~4, y=1~3) and the matching window formed by (x=2~4, y=2~4) are also shared by the search windows 510, 520 and 530, given that the weight coefficient groups adopted by the multiplication units 820 are appropriately adjusted, the WSAD calculation units 80 in FIG. 8 may also be utilized. It should be noted that, if the weight coefficient groups are the same, the WSAD calculation unit 80 may further share the multiplication unit 820 and the addition unit 830. For example, Weight0 and Weight1 are the same, and so the WSAD calculation unit 80 only needs two multiplication units 820, with one of the multipliers being Weight0 and the other being weight2. A calculation result of multiplying by Weight0 may be simultaneously used as the WSAD for the search windows 510 and 520.

Figure 9:
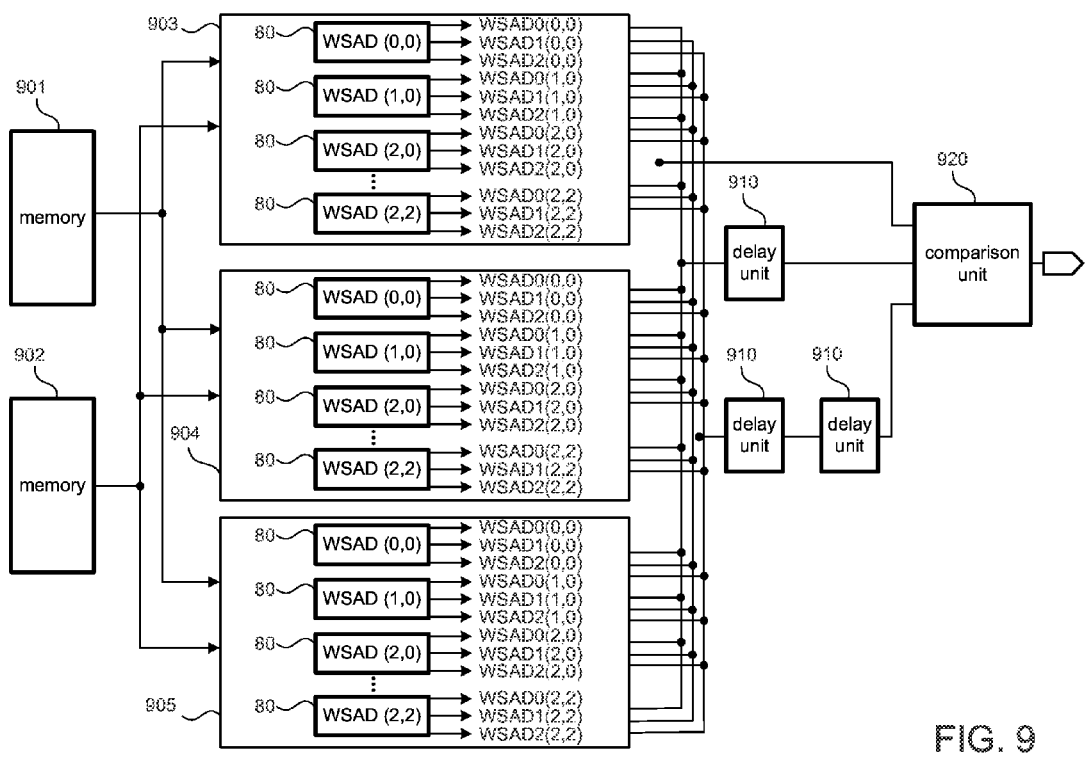
FIG. 9 is a circuit diagram of a circuit for calculating a full search WSAD of a target image and a reference image.

FIG. 9 shows a diagram of a circuit for calculating a full search WSAD of a reference image and a target image. Memories 901 and 902 store pixel data of the target image and the reference image, respectively. The two may be different memory blocks of a same physical memory or may be different physical memories, and may be implemented by a dynamic random access memory (DRAM) or a static random access memory (SRAM). In the embodiment, the foregoing 3×3 matching window is used in continuation. Also referring to FIG. 5, a WSAD calculation module 903 calculates a WSAD of a reference image formed by (x=0~L, y=0~4) and a corresponding target image. For the sake of simplicity and illustration purposes, in the diagram, only pixels of (x=0~6) are depicted. In practice, the x direction includes L pixels, where L is a positive integer that indicates the pixel count of a pixel line in the reference image and the target image. WSAD calculation modules 904 and 905 calculate respective WSADs of reference images formed by (x=0~L, y=1~5) and (x=0~L, y=2~6) and corresponding target images. The WSAD calculation modules 903 to 905 are distinguished for illustration purposes, and may be regarded as a same calculation module in practice. Each of the WSAD calculation modules 903 to 905 includes nine WSAD calculation units 80. Also referring to FIG. 7, the WSAD calculation unit 80 denoted WSAD(0, 0) represents the WSAD calculation unit used for calculating the WSAD of an upper-left matching window of a search window, i.e., a relative position indicated by the weight coefficient group Weight(0, 0). Similarly, the WSAD calculation unit 80 denoted WSAD(1, 0) represents the WSAD calculation unit used for calculating the WSAD of an upper-middle matching window of a search window, i.e., a relative position indicated by the weight coefficient group Weight(1, 0), and so forth. As shown in FIG. 8, each of the WSAD calculation units 80 generates three outputs. Taking the WSAD calculation unit 80 denoted as WSAD(0, 0) in FIG. 9 for example, this WSAD calculation unit 80 generates outputs WSAD0(0, 0), WSAD1(0, 0) and WSAD2(0, 0), which respectively represent the WSADs that the WSAD calculation unit 80 generates corresponding to three different search windows. Taking FIG. 5 for example, assume that the search window 530 is being calculated, the nine WSAD calculation units 80 of the WSAD calculation module 903 correspond to the nine matching windows of the search window 530, with the WSAD calculation unit 80 denoted WSAD(0, 0) corresponding to the upper-left matching window (the solid dots). As previously stated, the matching window is shared by the search windows 510, 520 and 530, and the weight coefficient groups of the three are respectively Weight0, Weight1 and Weight2. Thus, WSAD0(0, 0) actually represents a WSAD of the upper-right matching window of the search window 510, WSAD1(0, 0) actually represents a WSAD of the upper-middle matching window of the search window 520, and WSAD2(0, 0) actually represents a WSAD of the upper-left matching window of the search window 530. Therefore, the WSAD of the same matching window corresponding to multiple search windows can be obtained at the same time.

Figure 5:
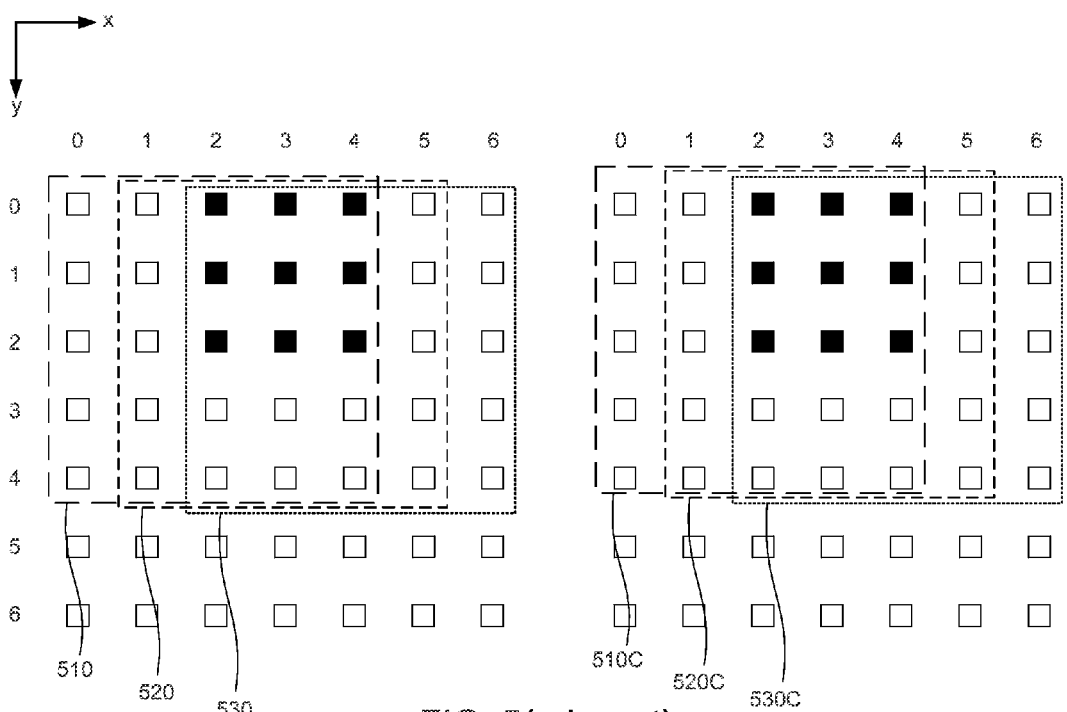
FIG. 5 is a schematic diagram of pixels in a search window range of a reference image and corresponding pixels in a target image.
Figure 6:
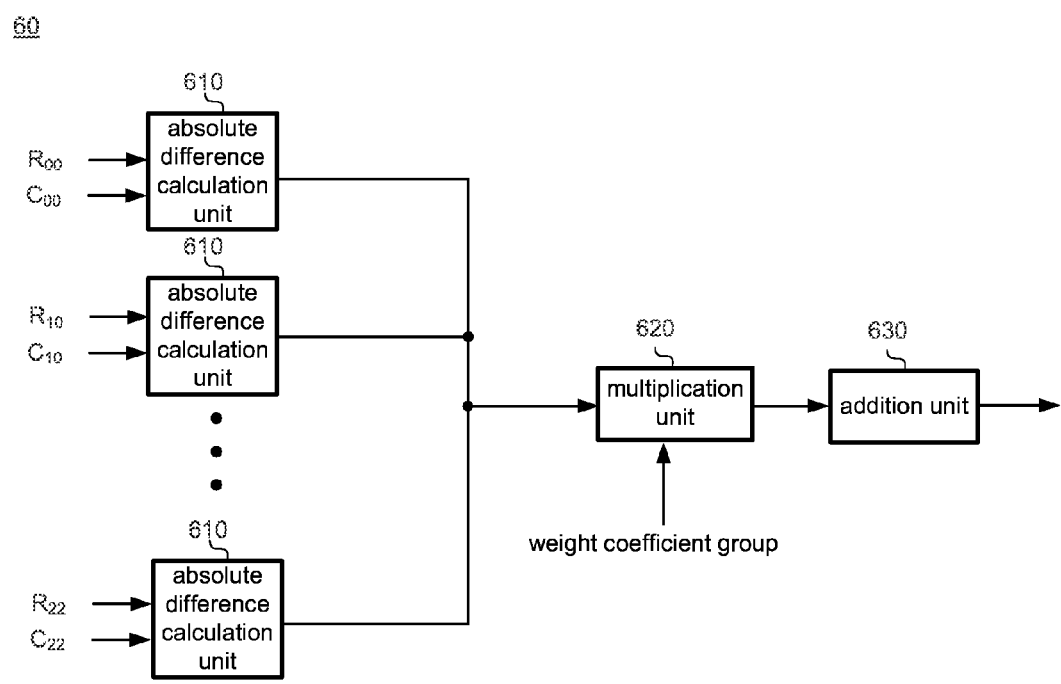
FIG. 6 is a circuit diagram of a conventional WSAD calculation unit.

The full search calculation method of the present invention is sequentially performed from the left to the right in a reference image or in a target image, i.e., in an order from a low value to a high value of x in FIG. 5. Thus, when WSAD0(0, 0) is obtained, the WSADs of other matching windows of the search window 510 are also obtained. That is to say, when WSAD0(0, 0) is obtained, a minimum WSAD of the search window 510 can be obtained by comparing other SADs previously obtained. For the other two WSADs, i.e., WASD1(0, 0) and WSAD2(0, 0), these two WSADs are delayed by one time unit or two time units by one or two delay units 910. After the WSADs of the search windows 520 and 530 are obtained, a comparison unit 920 then compares these WSADs to obtain the minimum WSAD. For example, the delay unit 910 may be implemented by a flip flop.

Figure 10:
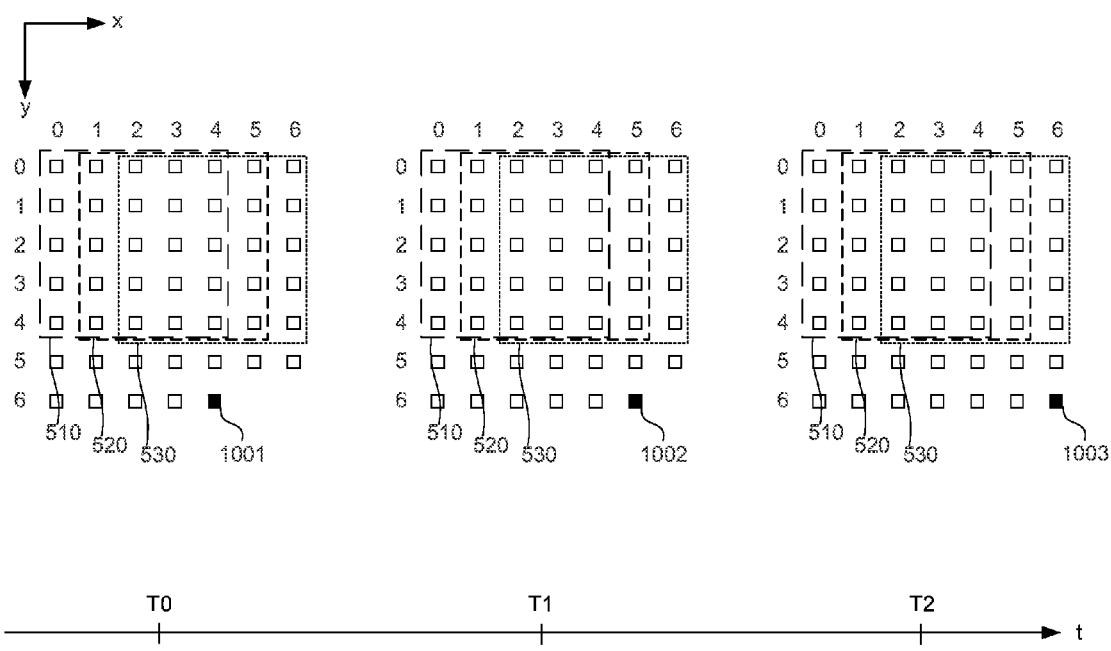
FIG. 10 is a timing diagram of reading pixels when calculating a full search WSAD of the present invention.

FIG. 10 shows a timing diagram of reading pixels when calculating a full search WSAD of the present invention. In FIG. 9, the memories 901 and 902 write pixels lines of a target image or a reference image one after another when storing data. Thus, when t=T0, the memory 901 or 902 already stores six pixel lines of (x=0~L, y=0~5), (for the sake of simplicity and illustration purposes, only pixels of (x=0~6) are depicted in the diagram, and the x direction actually includes more pixels), and a new-coming pixel 1001 makes the pixels in an area (x=0~4, y=0~6) complete. At this point, the WSAD calculation modules 903 to 905 utilize the pixel data of the area (x=0~4, y=0~6) for calculation. When t=T0, for the search window 510, three WSADs, i.e., WSAD0(0, 0), WSAD0(0, 1) and WSAD0(0, 2), are obtained. When t=T1, a new-coming pixel 1002 makes the pixels in an area (x=1~5, y=0~6) complete. The WSAD calculation modules 903 to 905 in FIG. 9 then utilize the pixel data of the area (x=1~5, y=0~6) for calculation. At this point, for the search window 510, three WSADs, i.e., WSAD0(1, 0), WSAD0(1, 1) and WSAD0(1, 2), are obtained; for the search window 520, three WSADs, i.e., WSAD1(0, 0), WSAD1(0, 1) and WSAD1(0, 2), are obtained. When t=T2, a new-coming pixel 1003 makes the pixels in an area (x=2~6, y=0~6) complete. The WSAD calculation modules 903 to 905 in FIG. 9 then utilize the pixel data of the area (x=2~6, y=0~6) for calculation. At this point, for the search window 510, three WSADs, i.e., WSAD0(2, 0), WSAD0(2, 1) and WSAD0(2, 2), are obtained; for the search window 520, three WSADs, i.e., WSAD1(1, 0), WSAD1(1, 1) and WSAD1(1, 2), are obtained; for the search window 530, three WSADs, i.e., WSAD2(0, 0), WSAD2(0, 1) and WSAD2(0, 2), are obtained. In other words, when t=T2, nine WSADs that the search window 510 needs are all generated (the same applies for the search windows corresponding to (x=0~4, y=1~5) and (x=0~4, y=2~6)). Accordingly, the minimum WSAD can be obtained. For (y=0~4), by delaying a part of the calculation results, one of the search windows (520, 530 . . . ) will obtain the nine required WSADs at each subsequent time unit (T3, T4, T5 . . . ), thereby obtaining the corresponding minimum WSAD. Therefore, for (y=0~6), three minimum WSADs can be obtained at each subsequent time unit (T3, T4, T5 . . . ).

In a conventional solution that does not share circuits, when t=T2, the minimum WSADs of three search windows (i.e., the search window 510 and the two search windows below the search window 510) can be obtained. All pixels of (x=1~5, y=0~6) need to be again calculated when t=T3, all pixels of (x=2~6, y=0~6) need to be again calculated when t=T4, and all pixels of (x=3~7, y=0~6) need to be again calculated when t=T5, so as to obtain the minimum WSADs of three search windows (i.e., the search window 520 and the two search windows below the search window 520). That is to say, when circuits are not shared, a next result (i.e., three minimum WSADs in this example, and one result may include several minimum WSADs, depending on the sizes of the matching window and the search window) can only be obtained at an interval of three time units. Compared to the conventional solution, the present invention generates one result at an interval of one time unit, thereby significantly enhancing efficiency.

Figure 11:
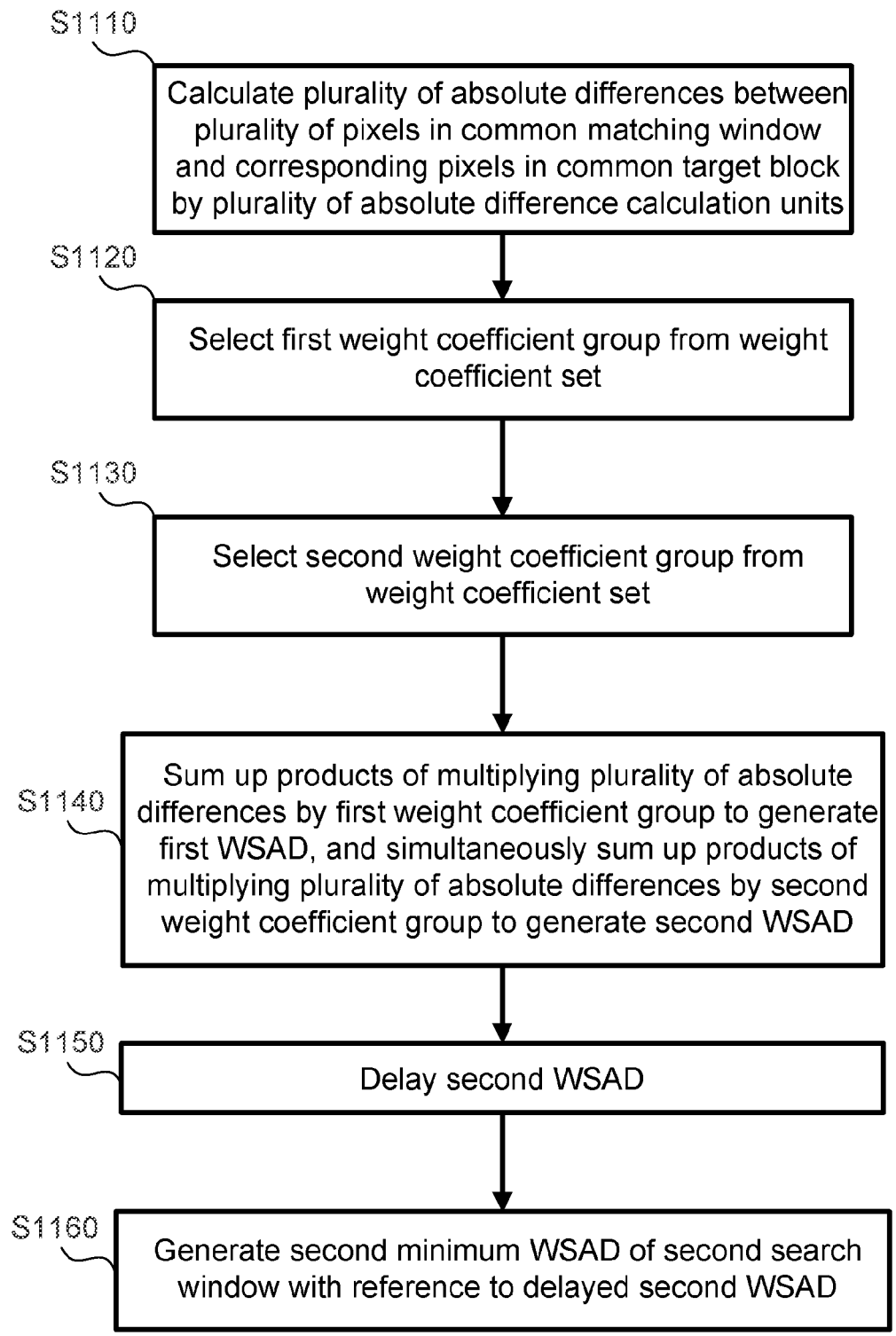
FIG. 11 is a flowchart of an image processing method according to an embodiment of the present invention.

FIG. 11 shows a flowchart of an image processing method according to an embodiment of the present invention. In addition to the foregoing image processing circuit, the present invention correspondingly provides an image processing method applied for calculating a WSAD of two images to reduce the number of logic gates required in a circuit. The method may be performed by the disclosed image processing circuit or an equivalent circuit. The method is for calculating a WSAD of a search window (e.g., the search window 510) in a reference image and a corresponding target window (e.g., the target window 510C) in a target image, and a WSAD of another search window (e.g., the search window 520) in the reference image and a corresponding target window (e.g., the target window 520C) in the target image. As shown in FIG. 11, the method according to an embodiment includes following steps.

In step S1110, a plurality of absolute differences between a plurality of pixels in a common matching window and corresponding pixels in a common target block are calculated by a plurality of absolute difference calculation units. As shown in FIG. 5, the common matching window (the matching window formed by solid dots at the left half of FIG. 5, including the pixels $R_{00}$~$R_{22}$) corresponds to the common matching block (the block formed by solid dots at the right sides of FIG. 5, including the pixels $C_{00}$~$C_{22}$). Thus, in this example, nine absolute difference calculation units are needed for respectively calculating absolute differences $|R_{ij}-C_{ij}|$, where i=0~2 and j=0~2.

In step S1120, a first weight coefficient group is selected from a weight coefficient set. In the embodiment, each of the search windows 510 and 520 includes nine matching windows. There are two approaches for determining the weight coefficient set. In the first approach, nine weight coefficient groups are determined according to relative positions of the matching window and the search window, as the nine situations shown in FIG. 7, and the weight coefficient set includes these nine weight coefficient groups. In the second approach for determining the weight coefficient set, different search windows have respective weight coefficient groups. For example, the search window 510 has the weight coefficient group Weight0, the search window 520 has the weight coefficient group Weight1, and all matching windows in one search window may utilize the same weight coefficient group. Alternatively, the weight coefficient set may include weight coefficient groups of more search windows. For the first type of weight coefficient set, according to the relative positions of the common matching window and the search window 510, this step decides to use the weight coefficient group Weight(2, 0). For the second type of weight coefficient set, this step decides to utilize the weight coefficient group Weight0 according to the search window 510.

In step S1130, a second weight coefficient group is selected from the weight coefficient set. As stated in the previous step, for the first type of weight coefficient set, this step decides to utilize the weight coefficient group Weight(1, 0); for the second type of weight coefficient, this step decides to utilize the weight coefficient group Weight1 according to the search window 520.

In step S1140, the plurality of absolute differences are multiplied by the first weight coefficient group, and the product are summed up to generate a first WSAD (corresponding to the search window 510); the plurality of absolute differences are multiplied by the second weight coefficient group, and the products are summed up to generate a second WSAD. It is seen from this step that, the same absolute differences may be shared when calculating the first WSAD and the second WSAD. That is, the plurality of absolute difference calculation units used in step S1110 may be shared. Further, when the first weight coefficient group is equal to the second weight coefficient group, this step only needs one multiplication unit and one addition unit to simultaneously calculate the first WSAD and the second WSAD (the two are actually equal). However, when the first weight coefficient group is not equal to the second weight coefficient group, this step needs one multiplication unit and one addition unit to respectively calculate the first WSAD and the second WSAD.

In step S1150, the second WSAD is delayed. For the search window 510, the first WSAD obtained in step S1140 may be compared with other previously obtained WSADs of the search window 510 to obtain a minimum WSAD of the search window 510. More specifically, referring to FIG. 10, the first WSAD is generated at the time point T2, and other WSADs of the search window 510 have already been generated at time points T0 and T1. Thus, at T2, the minimum WSAD of the search window 510 can be obtained. On the other hand, for the search window 520, the second WSAD obtained at T2 is only a part of all the WSADs required by the search window 520, and it is waited until other WSADs are generated at T3 (not shown). Thus, the second WSAD needs to be delayed by one time unit.

In step S1160, a second minimum WSAD of the second search window is generated according to the delayed second WSAD. At the time point T3, all the WSADs of the search window 520 are generated. Thus, the second WSAD delayed in step S1150 and other WSADs may be compared to obtain the minimum WSAD of the search window 520.

One person skilled in the art can understand details and possible implementation variations of the method in FIG. 11 according to the disclosure of the devices in FIG. 8 and FIG. 9 with reference of description of FIG. 5, FIG. 7 and FIG. 10. Without affecting the full disclosure and possible implementation, such repeated description is omitted herein. Further, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although a matching window in a size of 3×3 is taken as an example in the foregoing embodiments, based on the disclosure of the present invention, one person skilled in the art may appropriately apply the present invention to matching windows in other sizes.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing circuit, adapted to calculate a first minimum weighted sum of absolute difference (WSAD) of a first search window in a reference image and a corresponding first target window in a target image, and a second minimum WSAD of a second search window in the reference image and a corresponding second target window in the target image, wherein the first search window and the second search window have a common matching window, and the first target window and the second target window have a common target block, the circuit comprising:

a calculation module implemented with hardware including logic gates, configured to generate a plurality of first WSADs according to the first search window, the first target window and a weight coefficient set, and to generate a plurality of second WSADs according to the second search window, the second target window and the weight coefficient set, wherein the calculation module comprises:

a plurality of absolute difference calculation units, configured to respectively calculate an absolute difference between a pixel in the common matching window and a corresponding pixel in the common target block;

a first multiplication unit, configured to multiply the absolute differences by a first weight coefficient group of the weight coefficient set to generate a plurality of first weighted absolute differences;

a first addition unit, configured to add the first weighted absolute differences to obtain one of the first WSADs;

a second multiplication unit, configured to multiply the absolute differences by a second weight coefficient group of the weight coefficient set to generate a plurality of second weighted absolute differences; and a second addition unit, configured to add the second weighted absolute differences to obtain one of the second WSADs; and a comparison unit, configured to compare the first WSADs and the second WSADs to generate the first minimum WSAD and the second minimum WSAD, respectively;

wherein the calculation module generates one of the first WSADs and one of the second WSADs according to the common matching window, the common target block and the weight coefficient set.

2. The image processing circuit according to claim 1, wherein the first weight coefficient group is determined according to the first search window, and the second weight coefficient group is determined according to the second search window.

3. The image processing circuit according to claim 2, wherein the first weight coefficient group is determined according to relative positions of the common matching window and the first search window, and the second weight coefficient group is determined according to relative positions of the common matching window and the second search window.

4. The image processing circuit according to claim 1, wherein the weight coefficient set comprises a first weight coefficient group corresponding to the first search window and a second weight coefficient group corresponding to the second search window, the first weight coefficient group is equal to the second weight coefficient group, and the calculation module comprises:

a plurality of absolute difference calculation units, configured to respectively calculate an absolute difference between a pixel in the common matching window and a corresponding pixel in the common target block;

a multiplication unit, configured to multiply the absolute differences by the first weight coefficient group to generate a plurality of weighted absolute differences; and an addition unit, configured to add the weighted absolute values to obtain an accumulated value, which simultaneously serves as one of the first WSADs and one of the second WSADs.

5. The image processing circuit according to claim 1, the second WSADs being generated at different time points, the image processing circuit further comprising:

a delay unit, configured to delay one of the second WSADs;

wherein, the comparison unit generates the second minimum WSAD according to the one of the second WSADs delayed by the delay unit.

6. The image processing circuit according to claim 5, wherein the delay unit comprises a flip flop.

7. An image processing method, for calculating a first weighted sum of absolute difference (WSAD) of a first search window in a reference image and a corresponding first target window in a target image, and a second WSAD of a second search window in the reference image and a corresponding second target window in the target image; the first search window and the second search window having a common matching window, the first target window and the second target window having a common target block; the method comprising:

a) calculating a plurality of absolute differences between a plurality of pixels in the common matching window and corresponding pixels in the common target block;
b) selecting a first weight coefficient group from a weight coefficient set;
c) selecting a second weight coefficient group from the weight coefficient set; and
d) sharing the absolute differences generated in step (a), summing up products from respectively multiplying the absolute differences by the first weight coefficient group to generate the first WSAD by utilizing a first multiplication unit and a first addition unit, and summing up products from respectively multiplying the absolute differences by the second weight coefficient group to generate the second WSAD by utilizing a second multiplication unit and a second addition unit.

8. The image processing method according to claim 7, wherein the first weight coefficient group is determined according to relative positions of the common matching window and the first search window.

9. The image processing method according to claim 7, wherein the first weight coefficient group is equal to the second weight coefficient group, and step (d) utilizes a same multiplication unit and a same addition unit to generate the first WSAD and the second WSAD.

10. The image processing method according to claim 7, further comprising:
e) delaying the second WSAD; and
f) generating a minimum WSAD of the second search window according to the delayed second WSAD.

11. An image processing circuit, adapted to calculate a first weighted sum of absolute difference (WSAD) of a first search window in a reference image and a corresponding first target window in a target image, and a second WSAD of a second search window in the reference image and a corresponding second target window in the target image; the first search window and the second search window having a common matching window, the first target window and the second target window having a common target block, the common target block comprising a plurality of pixels; the circuit comprising:

a plurality of absolute difference calculation units implemented in hardware, configured to respectively calculate an absolute difference between a pixel in the common matching window and a corresponding pixel in the common target window;
a first multiplication unit implemented in hardware including logic gates, configured to multiply the absolute differences by a first weight coefficient group of a weight coefficient set to generate a plurality of first weighted absolute differences;
a first addition unit implemented in hardware including logic gates, configured to add the first weighted absolute differences to obtain the first WSAD;
a second multiplication unit implemented in hardware including logic gates, configured to multiply the absolute differences by a second weight coefficient group of the weight coefficient set to generate a plurality of second weighted absolute differences; and
a second addition unit implemented in hardware including logic gates, configured to add the second weighted absolute differences to obtain the second WSAD.

12. The image processing circuit according to claim 11, wherein the first weight coefficient group is determined according to the first search window, and the second weight coefficient group is determined according to the second search window.

13. The image processing circuit according to claim 12, wherein the first weight coefficient group is determined according to relative positions of the common matching window and the first search window, and the second weight coefficient group is determined according to relative positions of the common matching window and the second search window.

14. The image processing circuit according to claim 11, wherein when the first weight coefficient group is equal to the second weight coefficient group, the first multiplication unit and the second multiplication unit are a same multiplication unit.

* * * * *